United States Patent [19]

Bürkner et al.

[11] 4,405,277

[45] Sep. 20, 1983

[54] UNLOADING RACK WITH ELEVATING DEVICE FOR A HEAT PRESS

[75] Inventors: Wolfgang Bürkner, Darmstadt; Gerhard Melzer, Lautertal, both of Fed. Rep. of Germany

[73] Assignee: Carl Schenck AG, Fed. Rep. of Germany

[21] Appl. No.: 244,045

[22] Filed: Mar. 16, 1981

[30] Foreign Application Priority Data

Apr. 10, 1980 [DE] Fed. Rep. of Germany ....... 3013767

[51] Int. Cl.[3] .......................... B65H 29/00; B29J 5/04

[52] U.S. Cl. .................................. 414/222; 100/196; 198/435; 414/277; 414/749

[58] Field of Search ............... 414/222, 277, 280, 749, 414/750; 198/435, 472; 100/194, 196, 199, 207

[56] References Cited

U.S. PATENT DOCUMENTS

| | | | |
|---|---|---|---|
| 3,810,730 | 5/1974 | Carlsson | 414/280 X |
| 4,023,687 | 5/1977 | Salloum | 414/280 X |
| 4,065,003 | 12/1977 | Hostettler | 414/277 |
| 4,116,324 | 9/1978 | Burmeister | 198/472 |

*Primary Examiner*—Douglas C. Butler
*Assistant Examiner*—Donald W. Underwood
*Attorney, Agent, or Firm*—Connolly and Hutz

[57] ABSTRACT

The present invention relates to an unloading rack for a heat press. The unloading rack includes an extracting device for removing product from the heat press onto a conveyer system, and the extracting device and conveyer system are connected to elevator structure for raising and lowering them in correlation to the various levels of the press. The conveyer systems includes an individual conveyer for each level of the heat press, and each individual conveyer has standard and auxiliary storing levels.

1 Claim, 3 Drawing Figures

UNLOADING RACK WITH ELEVATING DEVICE FOR A HEAT PRESS

BACKGROUND OF THE INVENTION

Scheibert Spannplatten (Scheibert Chipboards), published by the textbook publishers Leipzig, 1958, illustrate at page 235 an automatic extracting device which cooperates with a heat press. This automatic extracting device operates together with an unloading rack having an elevating device in order to conduct finished chipboards or fiberboards, or a combination thereof onto an unloading rack. Such unloading follows heat pressing of the finished chipboards, either together with their underlayments or after separation from the underlayments, after which the chipboards may be subjected to further processing. In order to reduce the friction between underlayment and the support in the unloading rack, rollers are provided for the heat press. Such rollers, which have a very small diameter, are indeed suitable for the reduction of friction between press plate and unloading unit but are not suitable if other underlayments are to be extracted from a heat press.

Should a breakdown occur in production with a pressing exchange having just occurred, the heat press unloading rack must first be unloaded in order to subsequently pull out from the heat press the non-pressable chipboards due to the breakdown. Considerable time is required for such emergency unloading. So far, arrangements for executing such emergency unloading in a simple manner have been lacking, even where the unloading rack with a vertically adjustable elevating mechanism is positioned adjacent to the heat press.

SUMMARY OF THE INVENTION

Emanating therefrom, an object of the present invention is reliably to effect a quick unloading of a heat press in a short period of time, especially in case of emergency. This object is accomplished, according to the invention, in that each unloading unit of an unloading rack includes a standard support level and an auxiliary support level. At least one extracting or workpiece removing device cooperates with each unloading unit for removing workpieces from the press. An elevator raises and lowers the unloading rack so as to align the standard or auxiliary support levels of each unloading unit with the various levels of the heat press. This makes it possible to utilize the unloading rack as an emergency storage unit for the heat press without providing an expensive unloading system in addition to the unloading rack. By providing the auxiliary unloading support levels without having the unloading units per se unloaded in raising the unloading rack by half a level, a complete load of the chipboard located in a heating press and not pressable due to the breakdown, may be extracted smoothly from the press if a single auxiliary unloading level is provided. If several auxiliary support levels are provided, the capacity of the unloading rack may be increased as a whole and, furthermore, its function as an emergency unloading apparatus is maintained if care is taken that one unloading unit is kept free to receive a load.

If an increased flow of underlayments occurs during repair, for example, the unloading rack is also suitable as a supplemental storage unit for receiving additional underlayments in addition to already pressed chipboards without having to remove the chipboards from circulation through the production line. An embodiment of the invention is that each unloading unit includes a chain conveyer arranged with the rotational axes thereof between the standard support level and the auxiliary support level. Each chain carries at least one chain lug which may be brought into engagement with an underlayment after it is extracted from the press. The drive for the chain conveyor may be reversed and the unloading rack elevated in order to align the auxiliary support level with the heat press level and the underlayment thereon. After the underlayment is removed from the heat press the chain lug draws it onto the auxiliary support level. In a normal unloading operation from the heat press, the unloading rack unit has applied to it the extracted chipboards, including their underlayments. In the event of a breakdown, the load still remaining in the press may be drawn onto the auxiliary levels of each unloading unit by means of reversing the drive for the chain conveyors and by simultaneously lifting the unloading rack or lowering the unloading rack by half a level.

BRIEF DESCRIPTION OF THE DRAWING

Novel features and advantages of the present invention in addition to those mentioned above will become apparent to those skilled in the art from a reading of the following description in conjunction with the accompanying drawing wherein similar reference characters refer to similar parts and in which.

DETAILED DESCRIPTION OF THE INVENTION

Figure 1:
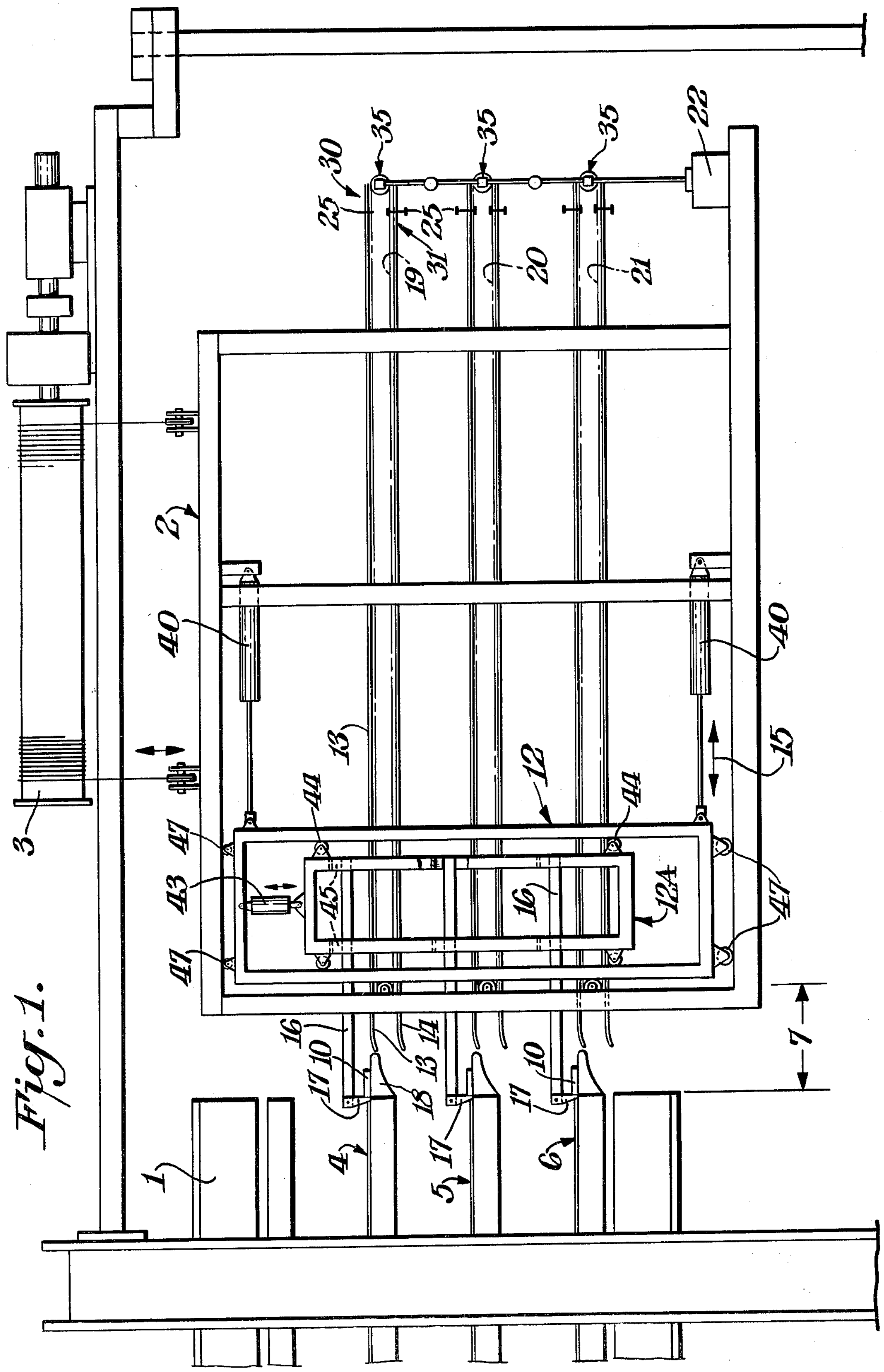
FIG. 1 is a side elevational schematic view of an unloading rack according to the present invention, and an adjacent portion of a heat press.

Connected to a heat press 1 is an unloading rack 2, which by means of an elevator 3 is arranged to be vertically adjusted with respect to individual levels 4, 5, 6 of the heat press. In order to maintain such vertical mobility, spacing 7 is provided between the unloading rack 2 and the heat press 1.

As shown best in FIG. 1, the heat press unloading rack includes a cage 12 that moves toward and away from the heat press 1 in the direction of arrow 15. The cage includes upper and lower rollers 47 that cooperate with the main framework of the unloading rack, and hydraulic cylinders and pistons 40 function to move the cage toward and away from the heat press. Flexible underlayments 9 including head bars 10 are used to support the material being pressed. The head bars 10 are positioned at the front of the underlayments and extend slightly past the side edges thereof. The cage 12 serves as a support for an extractor beam frame **12*a* connected for vertical movement relative to the cage 12. Rollers 44 at the sides of the frame 12*a* cooperate with the cage, and a motivator 43 between the cage and the extractor beam frame 12*a* at the upper end thereof functions to raise and lower the frame. The extractor beam frame carries horizontally extending beams or arms 16 with hooks 17 at the free ends thereof. The arm 16 extend toward the levels of the heat press 1 and function to remove the chipboard laden underlayments 9 from the heat press 1. As explained more fully below, the arms move up and down within the framework of cage 12 via the motivator 43 and also via the elevator 3. Horizontal movement of the arms is accomplished via the cylinders and pistons 40. The hooks 17 fit over the free end portions of the head bars 10 and draw the underlayments 9 onto the standard and auxiliary support levels or decks 13,14**, as explained below.

As shown in FIG. 1, the head bars 10 are supported on brackets 18 just beyond heat press 1 so that they may reliably be grasped from behind by the hooks 17 on arms 16. In place of the flexible underlayment 9, however, metal underlayment (not shown) may be employed in which case brackets 18 are not necessary.

Once the underlayments 9 come into the area of support 13 or 14 via shifting movement of the extractor bars 16, chain conveyors 19,20,21 are set in motion, preferably by means of a central reversible drive 22, so that chain lugs 25 on each of the conveyors engage the free ends of the head bars 10 of the finished chipboards removed from the heat press 1. Such action draws the finished chipboards including the underlayments 9 into the unloading rack 2 onto the standard support deck 13. For simplicity, only one side of the unloading rack is illustrated, the other side being completely symmetrically and likewise provided with a series of chain conveyors and chain lugs.

Figure 2:
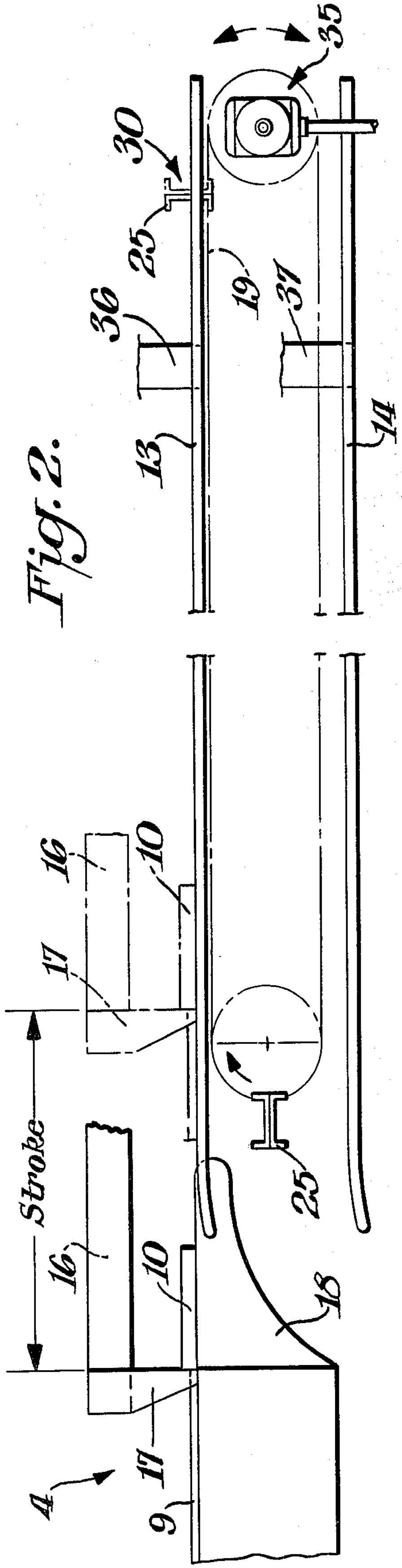
FIG. 2 is an enlarged and partial side elevational schematic view of the unloading rack of FIG. 1 illustrating loading of the standard deck.
Figure 3:
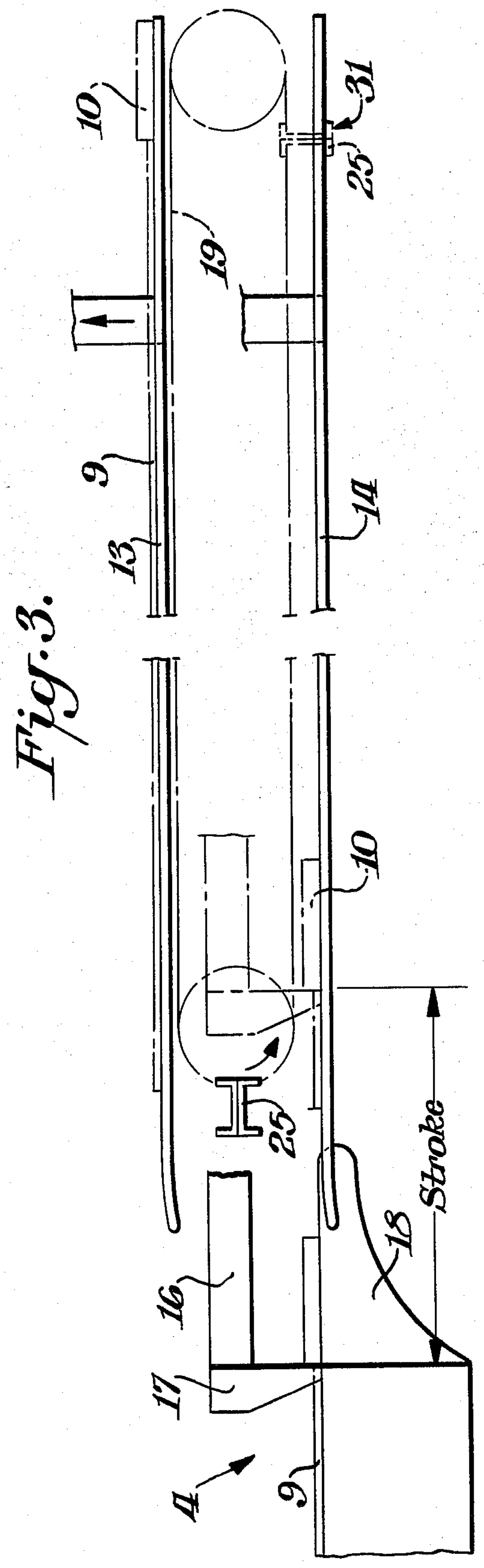
FIG. 3 is a view similar to FIG. 2 illustrating loading of the auxiliary deck of the unloading rack.

After depositing the chipboards, provided with underlayments 9, onto support deck 13, the chain lugs ultimately move to a position 30, as shown best in FIG. 2. Movement of the chain conveyors 19,20,21 is in a clockwise direction as viewed in FIG. 2. In the event of a breakdown, the central drive 22 is reversed and the chain lugs situated in position 30 move to the left in the direction toward heat press 1. Meanwhile, the elevator 3 has been activated so as to horizontally align the auxiliary levels or decks 14 with the levels 4,5,6 of the heat press, and the extractor arms 16 have pulled the fresh underlayments 9 onto the slide tables of the auxiliary support deck 14. The reversible drive 22 is maintained until the chain lugs engage the head bars 10 and move to the position 31.

FIG. 2 shows in greater detail the arrangement of the chain conveyor 19 on an enlarged scale, including returning gear 35, and the relationship of the conveyer with the standard support 13 and the auxiliary support 14. These supports are mounted on brackets 36,37 attached to the main framework of the unloading rack 2.

The drawing shows that even more than one auxiliary support 14 between any two supports 13 may be arranged if the corresponding number of chain conveyers is provided in each case. Thus the capacity of the chain conveyer may also be incorporated to a considerable extent as an auxiliary storage unit.

What is claimed:

1. An unloading apparatus for a multi-level heat press that presses substantially flat elongated workpieces comprising an unloading rack having a workpiece removing device correlated with each level of the press, an elevator connected to the rack for moving it up and down, an unloading unit for each press level mounted in the unloading rack and including standard and auxiliary workpiece support levels, one workpiece removing device being constructed and arranged to cooperate with each unloading unit for removing workpieces from the press, means connected to activate the elevator to horizontally align the standard or auxiliary support level of each unloading unit with its associated press level, and unloading means associated with each unloading unit for drawing workpieces onto the standard and auxiliary support levels of each unit, the unloading means comprising a horizontally disposed chain conveyer constructed for movement in one direction and also in the reverse direction, a chain lug secured to the conveyer adapted to engage a workpiece after removal from the press by the workpiece removing device, and a reversible drive for the chain conveyer whereby horizontal alignment of the standard support level and its associated press level together with rotation of the chain conveyer in one direction causes the chain lug to draw a workpiece onto the standard support level while horizontal alignment of the auxiliary support level and that press level with rotation of the chain conveyer in the opposite direction causes the chain lug to draw a workpiece onto the auxiliary support level.

* * * * *